United States Patent [19]

Mauller

[11] 4,184,109

[45] Jan. 15, 1980

[54] POSITION SERVO LOOP FOR ROBOT OR AUTOMATIC MACHINE

[75] Inventor: Christian Mauller, Sevres, France

[73] Assignee: Regie Nationale des Usines Renault, Billancourt, France

[21] Appl. No.: 791,402

[22] Filed: Apr. 27, 1977

[30] Foreign Application Priority Data

Apr. 30, 1976 [FR] France .................. 76 12879

[51] Int. Cl.² .................................... G05B 6/02
[52] U.S. Cl. .................................... 318/622; 318/621; 318/619
[58] Field of Search ............... 318/601, 619, 620, 621, 318/622

[56] References Cited

U.S. PATENT DOCUMENTS

| | | | |
|---|---|---|---|
| 2,520,177 | 8/1950 | Stoops | 318/621 |
| 2,946,943 | 7/1960 | Nye et al. | 318/621 |
| 3,741,474 | 6/1973 | Kawada et al. | 318/621 |
| 3,840,794 | 10/1974 | Clement et al. | 318/601 |
| 3,895,280 | 7/1975 | Peterson | 318/621 |
| 3,906,196 | 9/1975 | Spitz | 318/619 |

Primary Examiner—Gene Z. Rubinson
Assistant Examiner—Eugene S. Indyk
Attorney, Agent, or Firm—Oblon, Fisher, Spivak, McClelland & Maier

[57] ABSTRACT

A nonlinear servo compensator for insertion in the position servo loop of a robot or automatic machine comprising a direct path with an operational amplifier and a second amplifier for summing the direct signal and its derivative; and a shunt path with an inversion circuit, an analog multiplier, a resistive divider, a follower amplifier and a differentiating circuit.

3 Claims, 4 Drawing Figures

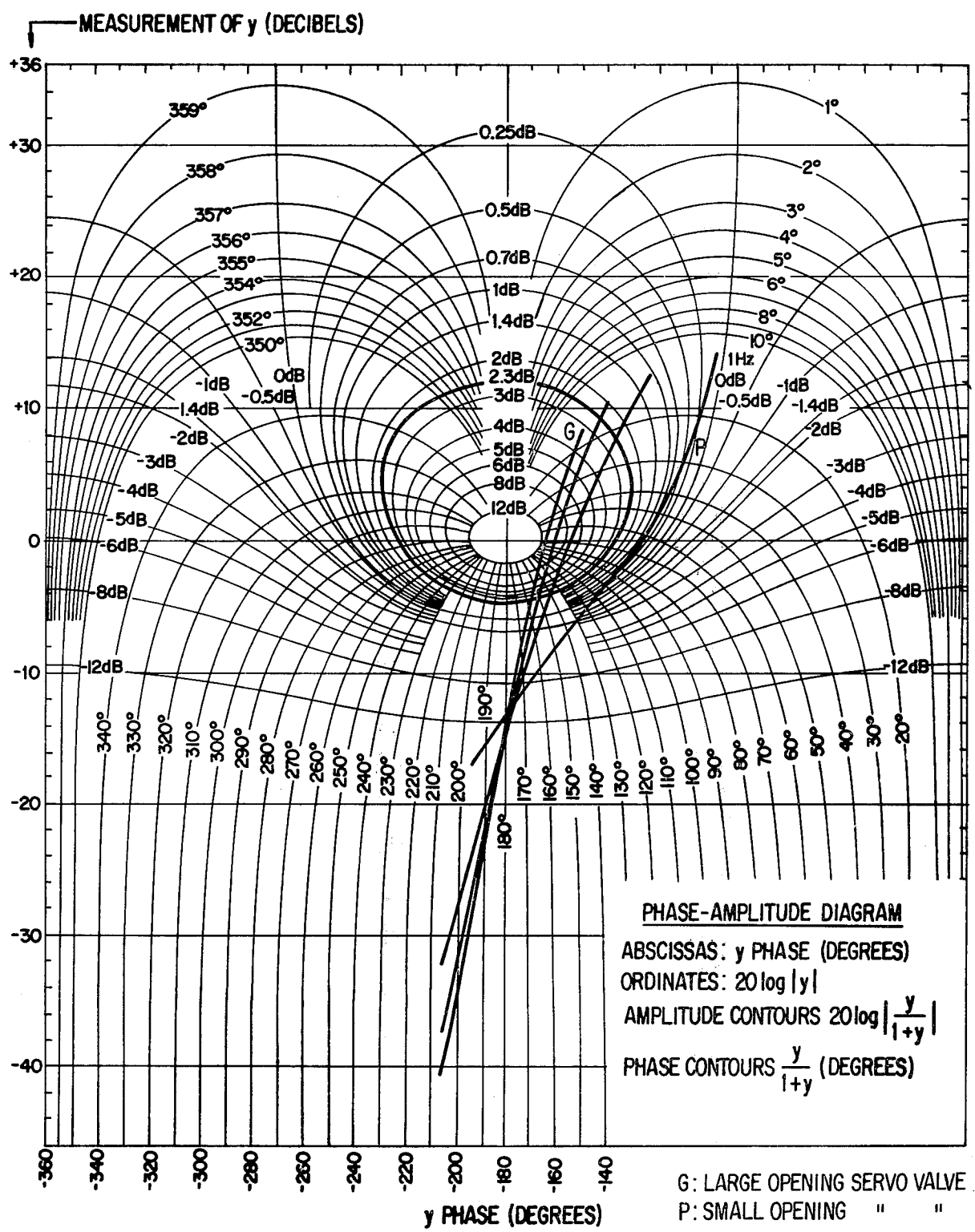
FIG. 3  UNCORRECTED AXIS

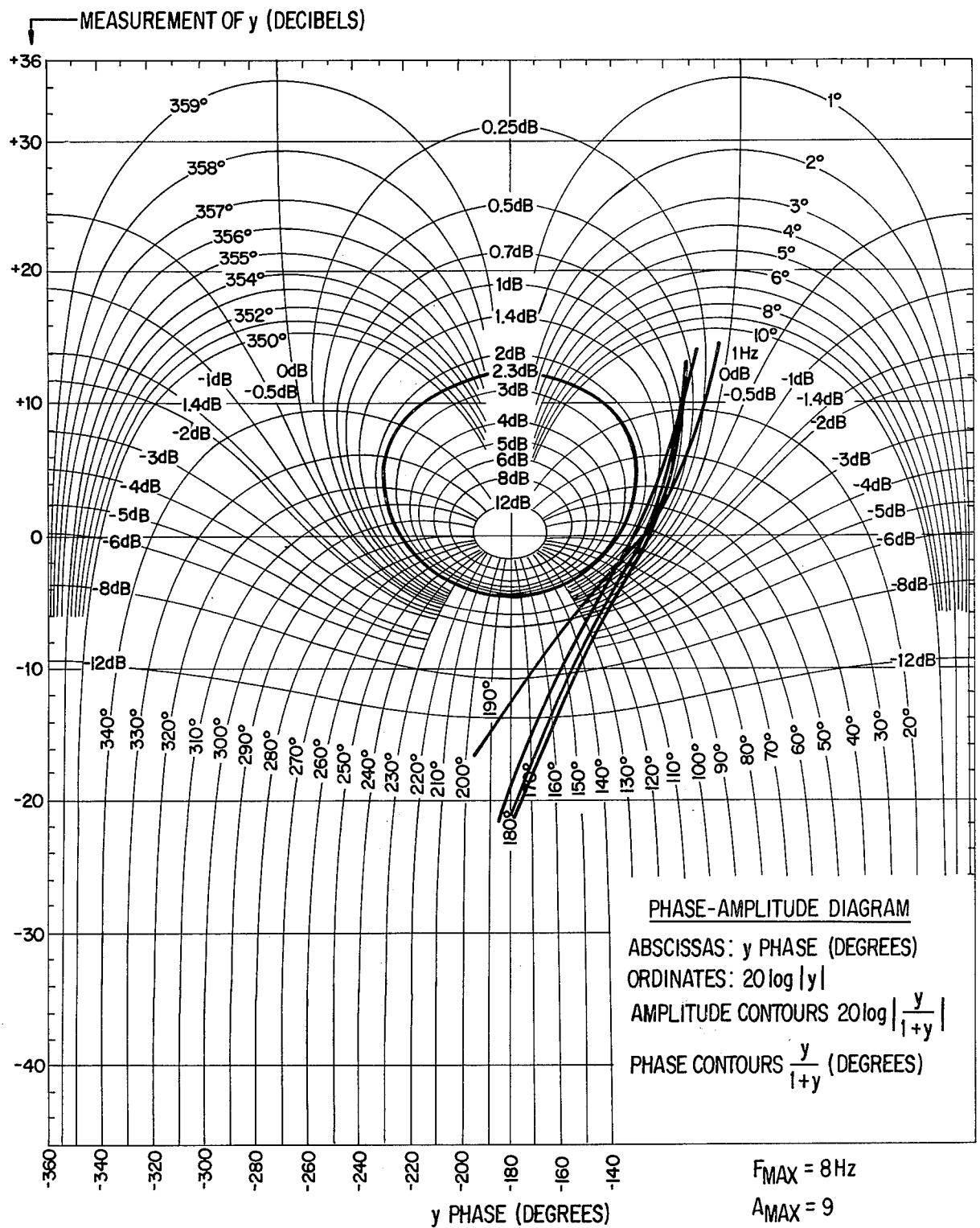
FIG.4 CORRECTED AXIS

POSITION SERVO LOOP FOR ROBOT OR AUTOMATIC MACHINE

BACKGROUND OF THE INVENTION

The present invention relates to an improved position servo loop for a robot or automatic machine.

In an articulated modular robot, capable of moving around a certain number of axes by means of a hydraulic motor with servovalve control in each axis, it is normal to use a servo loop to transmit the successive command signals to the servovalve. This servo loop has, as is well known, a feedback path which constantly furnishes to the input a signal corresponding to the position of the robot about the axis considered and thus permits establishment in a continuous manner of the position error in response to a position command and finally to correct this error so as to arrive at the desired position in the shortest time.

The most important qualities of a servomechanism are its stability, precision and speed of response. With these in mind it is desirable to avoid oscillatory operation, reduce overshoots and improve the response time of the servo loop. For example, in a Nichols chart the critical contours are to be avoided.

The present invention discloses a circuit with these improvements.

SUMMARY OF THE INVENTION

According to the invention, the position servo loop, particularly for a robot or automatic machine, which is of the type having connected in series a command input, an algebraic comparator, a digital-to-analog convertor, a bandwidth regulating device, a current coil driving the spools of a servovalve controlling the operation of a hydraulic motor and a feedback path from the hydraulic motor to the algebraic comparator having in series an incremental coder, a logic circuit for detecting the direction of motion with respect to the axis considered and an up-down counter, is characterized by the insertion in the forward path of a nonlinear servo compensator comprising an operational amplifier taking the sum of the input signal and its derivative, the amplitude of the latter being tied to the continuous level of the input signal.

According to one embodiment, the part of the nonlinear servo compensator which takes the derivative of the input signal comprises a series connection of an inversion generator, an analog multiplier, a resistive divider at the multiplier output and a circuit generating the derivative of the received signal. Other characteristics will appear from the description which follows, given only as an example. For this, reference will be made to the attached drawings:

BRIEF DESCRIPTION OF THE DRAWINGS

FIG. 3 is a Nichols chart on which are shown the characteristic curves of the position servo loop without the compensator and, FIG. 4 is a Nichols chart on which are shown the same characteristic curves in the case where the position servo is furnished with the non-linear compensator of the invention.

DESCRIPTION OF THE PREFERRED EMBODIMENTS

Figure 1:
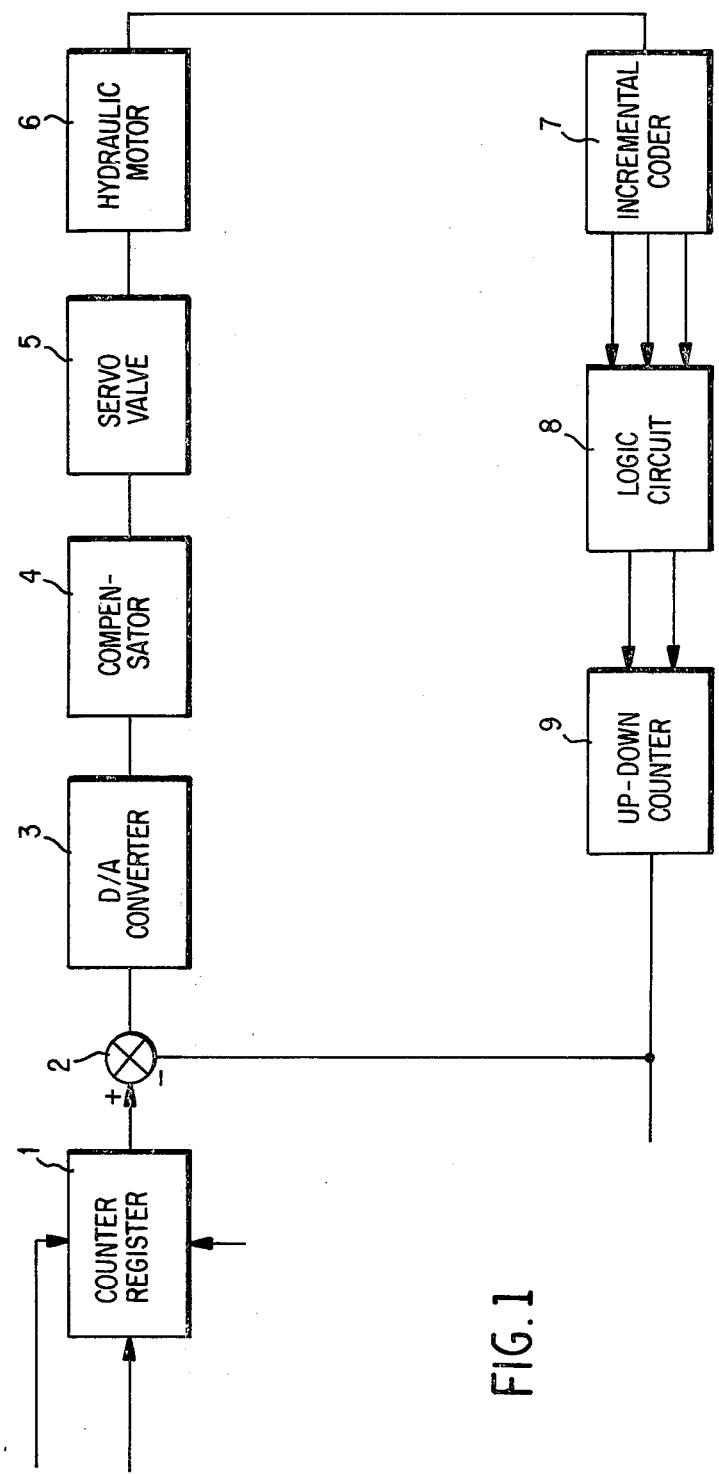
FIG. 1 is a block diagram of the servo loop of the invention.

According to FIG. 1 the input of the servo loop is, for example, in the form of a counter register 1 into which is introduced the desired-position information for the axis of the robot or automatic machine considered, either manually or by means of a computer in the case where it is desired to describe a complex trajectory at the free end of the robot or automatic machine. The counter register 1 sends a digital command to an algebraic adder 2. The output of algebraic adder 2 is connected to the input of a digital-to-analog convertor 3 also comprising the bandwidth regulation which, in accordance with the invention, is followed by a nonlinear compensator 4 which will be described below in detail with reference to FIG. 2. The nonlinear servo compensator 4 is connected to a current coil driving a servovalve 5 itself controlling the operation of a hydraulic motor 6 which drives the robot mechanism about a given axis. The feedback path of the servo loop includes first of all an incremental coder 7 which emits two pulse trains shifted by a quarter period plus a zero spike with each elementary angular displacement of the hydraulic motor 6.

The incremental coder 7 is connected at its output to a logic circuit 8 for detecting the direction of motion which emits counter pulses as well as a command for up or down counting on two output lines to an up-down counter 9 which is connected to a second input of the algebraic adder 2. The signal at the output of the up-down counter 9 gives an indication of the position about the axis considered; it can also be input to a computer in the case where the robot automatically follows a more or less complicated trajectory.

Figure 2:
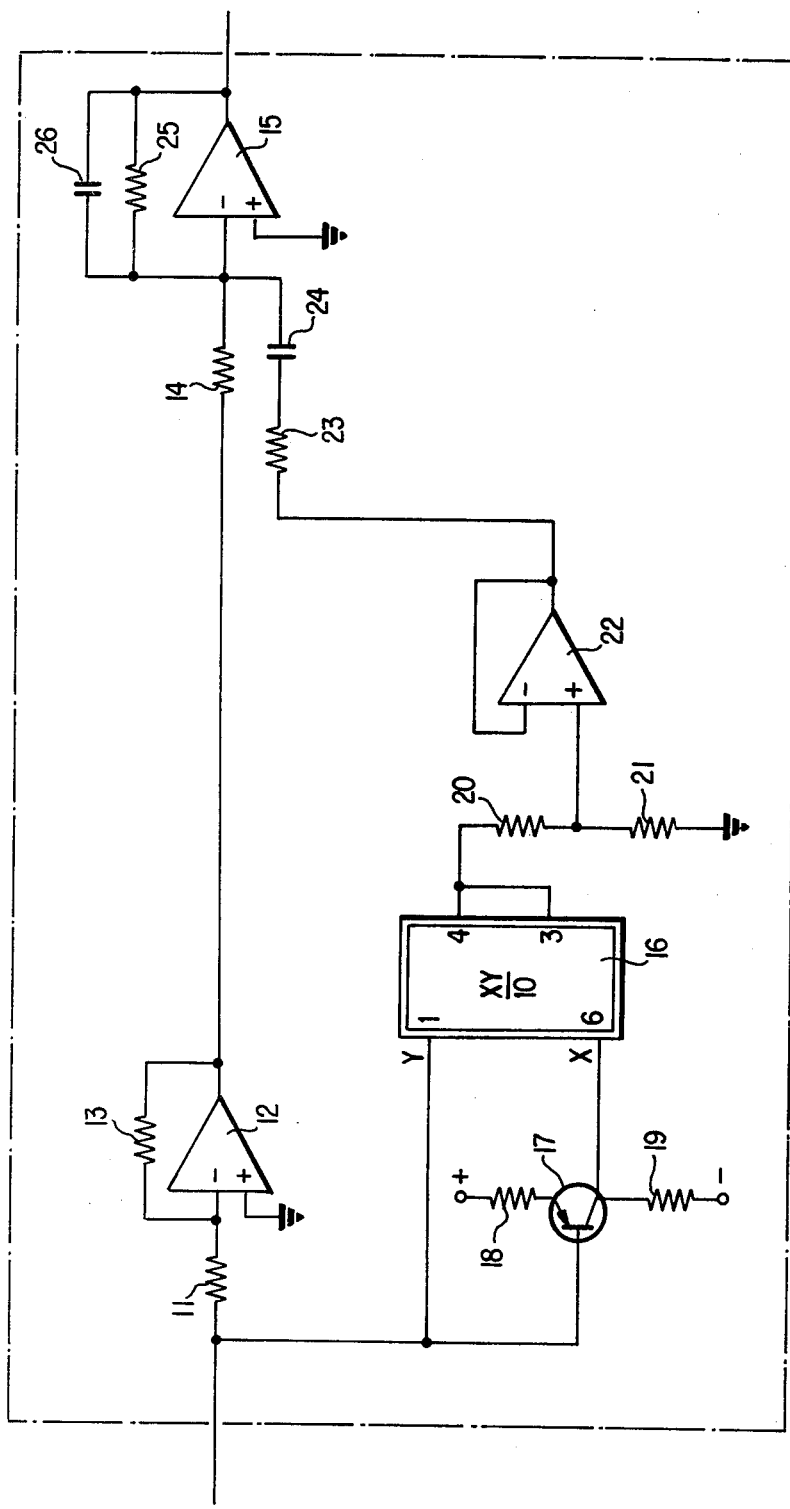
FIG. 2 shows a mode of realization of the non-linear compensator of the invention.

According to FIG. 2 the nonlinear servo compensator 4 of the invention comprises in a first direct path a resistance 11 connected to the inverting input of an operational amplifier 12 the non-inverting input to which is grounded, the feedback loop of the amplifier containing a resistance 13. The resistances 11 and 13 are equal in value. The output of the operational amplifier 12 is connected by way of a resistance 14 to the inverting input of a second operational amplifier 15 realizing at the output of the stage the sum of the signal received by the direct path and that received by the shunt path. This shunt path contains an analog multiplier 16 performing the operation X·Y/10 in which Y designates the signal at the input to the nonlinear compensator and X the absolute value of this signal and corresponds to the output of an inversion generator consisting of a transistor 17 the base of which receives the signal Y and the emitter-collector circuit of which is in series with two resistances 18 and 19 of the same value connected further to two power supplies of equal but opposite-polarity voltages. A voltage divider made up of the resistances 20, 21 is situated at the output of the analog multiplier 16 and its midpoint is connected to the non-inverting input of an operational amplifier 22 acting as a follower amplifier for impedance-matching purposes. The output of operational amplifier 22 is connected to the inverting input of the summing amplifier 15 by way of a differentiating circuit consisting of a resistance 23 and a capacitance 24 in series. The feedback of the output operational amplifier 15 is a resistance 25 and a capacitance 26 in parallel.

The resistances 20 and 21 determine the phase lead factor a and the resistance 23 and capacitance 24 determine the highest frequency f of the compensator.

$$a \text{ is defined by } \frac{R_{20}}{R_{21}} = \frac{2Y}{10} \cdot \frac{R_{14}}{R_{23}(a-1)} - 1$$

$a$ equals $a$ max for $Y = 10$ volts $$f = \frac{1}{2\pi R_{23}C_{24}}$$

The advantages resulting from insertion of the compensator are immediately apparent from comparison of FIGS. 3 and 4 which show the same characteristic curves on Nichols charts for the position servo loop without compensator (FIG. 3) and with the compensator of the invention (FIG. 4).

The curves in FIGS. 3 and 4 are the phase-amplitude plots of the open-loop transfer functions of the position servo loop. The plots in FIG. 3 indicate that at high speeds, curves denoted by $K_s$ max, i.e. with fully open servovalve, the servo is poorly damped and the loci cross into the interior of the 2.3 dB contour which bounds a critical zone that should be avoided.

The nonlinear compensator of the invention introduces a phase lead increasing in value with $K_s$ and zero for $K_s = 0$. $K_s$ denotes the coefficient of servovalve opening.

It is evident that the compensator is necessary for large openings of the servovalve and that the nonlinear compensator introduces phase lead at these openings, thus permitting the skirting of the critical 2.3 dB contour.

The bandwidth of the servo loop is improved at all servovalve openings and the damping is increased. In response to disturbances the system exhibits less overshoot and less oscillation. Thus the response time is improved.

Obviously, numerous additional modifications and variations of the present invention are possible in light of the above teachings. It is therefore to be understood that within the scope of the appended claims, the invention may be practiced otherwise than as specifically described herein.

I claim:

1. In a position servo loop for a robot or automatic machine, comprising the series connection in the forward path of: a command input, an algebraic comparator, a digital-to-analog converter, a bandwidth-adjusting circuit, a current coil driving the spools of a servovalve controlling the operation of a hydraulic motor making the mechanism of the robot pivot about a given axis, and the series connection in the feedback from the hydraulic motor to the algebraic comparator of: an incremental coder, a logic circuit for detecting the direction of motion about the given axis and an up-down counter the improvement comprising a nonlinear servo compensator connected in the forward path between the digital-to-analog convertor and the current coil driving the spools of the servovalve, the nonlinear servo compensator including a summing operational amplifier for taking the sum of an input signal and its derivative, the amplitude of the latter being tied to the continuous level of the input signal; and wherein the position servo loop includes:

means connected to the inverting input of the summing amplifier for generating the derivative of the input signal, and means connected to the inverting input of the summing amplifier for transferring the input signal, the derivative generating means including:

an analog multiplier, a resistive voltage divider connected at the output of the analog multiplier, a follower amplifier having its non-inverting input connected to the midpoint of the voltage divider, and a differentiating circuit connected between the output of the follower amplifier and the inverting input of the summing amplifier.

2. The position servo loop as in claim 1, wherein the analog multiplier is connected on the one hand by one of its inputs (Y) directly to the input of the nonlinear servo compensator, and on the other hand, by a second input (X), to the input of compensator by the intermediary of an inversion generator.

3. The position servo loop as in claim 2, wherein the inversion generator comprises two poles of the same absolute value of voltage but of opposite polarities, a transistor the base of which is connected to the input of the servo compensator, and two resistances of equal value situated on the two sides of the emitter-collector circuit of the transistor and connected in series between the two poles.

* * * * *